US00RE35535E

United States Patent [19]

Brumley et al.

[11] E Patent Number: Re. 35,535

[45] Reissued Date of Patent: Jun. 17, 1997

[54] BROADBAND ACOUSTIC DOPPLER CURRENT PROFILER

[75] Inventors: Blair H. Brumley, San Diego; Kent L. Deines, Poway; Ramon G. Cabrera, San Diego, all of Calif.; Eugene A. Terray, Woods Hole, Mass.

[73] Assignee: Rowe, Deines Instruments Incorporated, San Diego, Calif.

[21] Appl. No.: 435,856

[22] Filed: May 4, 1995

Related U.S. Patent Documents

Reissue of:

[64] Patent No.: 5,208,785
Issued: May 4, 1993
Appl. No.: 851,269
Filed: Mar. 13, 1992

U.S. Applications:

[63] Continuation of Ser. No. 588,469, Sep. 26, 1990, abandoned.

[51] Int. Cl.[6] ..... G01S 15/58

[52] U.S. Cl. ..... 367/90; 73/170.13

[58] Field of Search ..... 367/89, 90, 91; 342/104, 117; 364/565; 128/661.07; 73/170.13, 861.18

[56] References Cited

U.S. PATENT DOCUMENTS

| | | | |
|---|---|---|---|
| 3,648,225 | 3/1972 | Kritz et al. | 367/91 |
| 3,803,606 | 4/1974 | Lebail et al. | 367/87 |
| 4,050,055 | 9/1977 | DiLeo | 367/87 |
| 4,078,234 | 3/1978 | Fishbein et al. | 342/110 |
| 4,138,657 | 2/1979 | Shave | 367/91 |
| 4,219,887 | 8/1980 | MacCready, Jr. | 367/90 |
| 4,244,026 | 1/1981 | Dickey, Jr. | 367/89 |
| 4,270,191 | 5/1981 | Peynaud | 367/92 |
| 4,320,765 | 3/1982 | Cathignol et al. | 367/100 |
| 4,603,408 | 7/1986 | Singhal et al. | 367/137 |
| 4,640,292 | 2/1987 | Tykulsky et al. | 73/861.25 |
| 4,751,847 | 6/1988 | Katakura et al. | 73/861.25 |
| 4,794,574 | 12/1988 | Grall | 367/905 |
| 4,799,490 | 1/1989 | Namekawa | 73/861.25 |
| 4,831,874 | 5/1989 | Daubin et al. | 367/92 |
| 4,847,817 | 7/1989 | Au et al. | 367/135 |
| 4,872,146 | 10/1989 | Farmer et al. | 367/97 |
| 4,960,329 | 10/1990 | Schofield | 367/101 |

FOREIGN PATENT DOCUMENTS

| | | |
|---|---|---|
| A2170807 | 9/1973 | France . |
| 54-131971 | 10/1979 | Japan . |

OTHER PUBLICATIONS

Doviak, R.J., et al. (1976) Resolution of pulse–doppler radar range and velocity ambiguities in severe storms pp. 15–22.

"Electronic Communication Series, Radar Technology (Part II)," edited by Electronic Communication Society, first edition, issued on Apr. 30, 1968, pp. 119 to 124.

E–mail from Yasuo Muramatsu dated Jun. 21, 1996 regarding cited Japanese reference "Radar Technology," (see above reference B).

* English translation of Claim 1 of Japanese Patent Publication No. 54–131971.

Miller, et al., "A Covariance Approach to Spectral Moment Estimation", IEEE Transactions on Information Theory, Sep. 1972, pp. 588–596.

Cabrera, et al., "Development of a Practical Coherent Acoustic Doppler Current Profiler", pp. 93–97, Proceedings of Oceans, 1987.

Brumley, et al., "Performance of a Broadband Acoustic Doppler Current Profiler".

(List continued on next page.)

*Primary Examiner*—Daniel T. Pihulic
*Attorney, Agent, or Firm*—Knobbe, Martens, Olson & Bear

[57] ABSTRACT

A system and method for measuring current velocities using coded-pulse broadband acoustic signals. Autocorrelation of two phase coded pulses which are in the water during a single transmission cycle is used to calculate a Doppler frequency. The effective result is current profilers having improved profiling range and spatio-temporal resolution.

30 Claims, 6 Drawing Sheets

OTHER PUBLICATIONS

Foster, et al., "Flow Velocity Profile via Time–Domain Correlation: Error Analysis and Computer Simulation", IEEE Transactions on Ultrasonics, vol. 37, No. 2, May 1990, pp. 164–175.

Embree, et al., "Volumetric Blood Flow via Time–Domain Correlation: Experimental Verification", IEEE Transactions on Ultrasonics, vol. 37, No. 2, May 1990, pp. 176–189.

RD Instruments, "Pulse–to–Pulse Coherent Doppler Sonar Development, Phase I Report", Apr. 25, 1986.

Rowe, Francis D., "Pulse–to–Pulse Coherent Doppler Sonar Development (Broadband ADCP), Phase II Final Report", Jan. 16, 1990.

RD Instruments, "Non–Disclosure Agreement", Apr. 28, 1987.

Brumley, et al., "Doppler Profiler Observations at Stellwagen Bank", Aug. 2, 1989.

Rowe, Francis D., "Acoustic Doppler Velocity Profiler, Characterization Parameters", May 15, 1989.

Rowe, Francis D., "Letters", Oct. 5, 1989.

Lhermitte, Roger, "Doppler Sonar Observation of Tidal Flow".

Lhermitte, Roger, "Water Velocity and Turbulence Measurements by Pulse Coherent Doppler Sonar".

Lhermitte, Roger, "Observations of Water Flow with High Resolution Doppler Sonar".

Dickey, Jr., Frank, and Edward, John, "Velocity Measurement Using Correlation Sonar".

Preliminary Specification, Signetics NE/SA604A High–Performance Low–Power FM IF System, Dec. 1988.

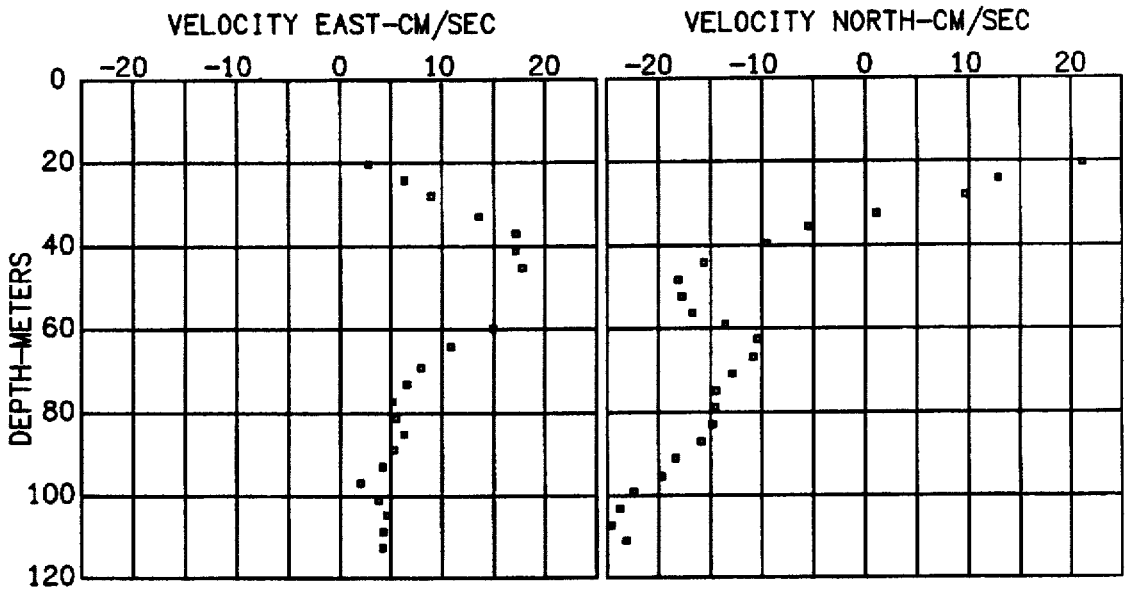
FIG. 1a
PRIOR ART
FIG. 1b
PRIOR ART
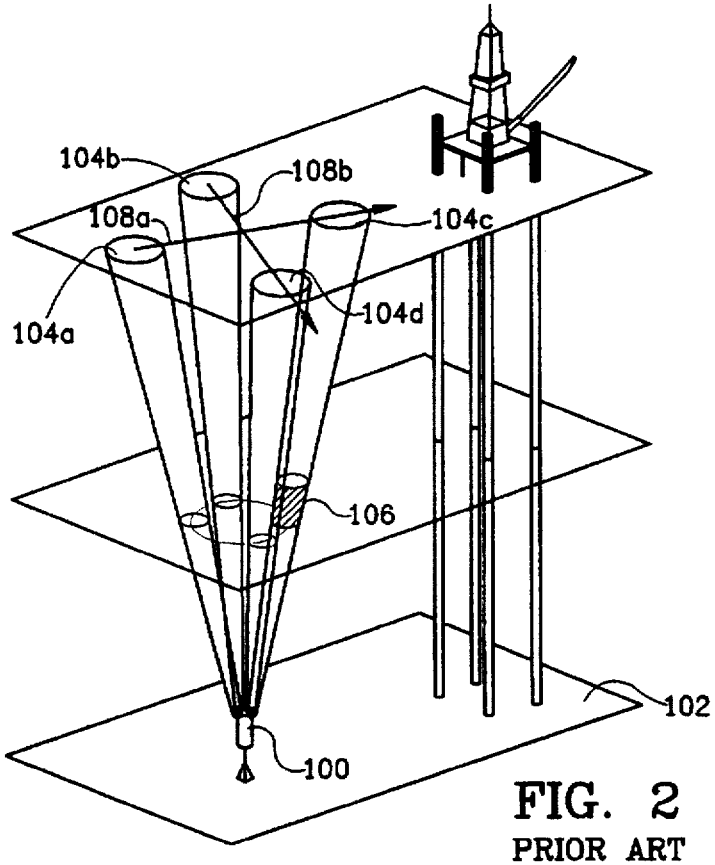
FIG. 2
PRIOR ART

DOPPLER MEASUREMENT TECHNIQUES

216
FIFO
214
SHIFT REGISTER
212a
212b
212c
212d
FROM 188a FIG. 6
FROM 189a FIG. 6
FROM 188b FIG. 6
FROM 189b FIG. 6
210
D/A CONVERTER
168
168

BROADBAND ACOUSTIC DOPPLER CURRENT PROFILER

Matter enclosed in heavy brackets [ ] appears in the original patent but forms no part of this reissue specification; matter printed in italics indicates the additions made by reissue.

This application is a continuation of application Ser. No. 07/588,469, filed Sep. 26, 1990 now abandoned.

BACKGROUND OF THE INVENTION

1. Field of the Invention

The present invention relates to velocity measurement system and, more particularly, to acoustic Doppler current profilers.

2. Description of the Prior Art

A current profiler is a type of sonar system that is used to remotely measure water velocity over varying ranges. Current profilers are used in freshwater environments such as rivers, lakes and estuaries, as well as in saltwater environments such as the ocean, for studying the effects of current velocities. The measurement of accurate current velocities is important in such diverse fields as weather prediction, biological studies of nutrients, environmental studies of sewage dispersion, and commercial exploration for natural resources, including oil.

Typically, current profilers are used to measure current velocities in a vertical column of water for each depth "cell" of water up to a maximum range, thus producing a "profile" of water velocities. The general profiler system includes a transducer to generate pulses of sound (which when down-converted to human hearing frequencies sound like "pings") that backscatter as echoes from plankton, small particles, and small-scale inhomogeneities in the water. The received sound has a Doppler frequency shift proportionate to the relative velocity between the scatters and the transducer.

The physics for determining a single velocity vector component ($V_x$) from such a Doppler frequency shift may be concisely stated by the following equation:

$$v_x = \frac{cf_D}{2f_T\cos\theta} \tag{1}$$

In equation (1), c is the velocity of sound in water, about 1500 meters/second. Thus, by knowing the transmitted sound frequency, $f_T$, and declination angle of the transmitter transducer, θ, and measuring the received frequency from a single, narrowband pulse, the Doppler frequency shift, $f_D$, determines one velocity vector component. Relative velocity of the measured horizontal "slice", or depth cell, is determined by subtracting out a measurement of vessel earth reference velocity, $V_e$. Earth reference velocity can be measured by pinging the ocean bottom whenever it comes within sonar range or by a navigation system such as LORAN or GPS. FIGS. 1a and 1b show example current profiles where North and East current velocities ($V_x$, $V_y$) are shown as a function of depth cells.

Commercial current profilers are typically configured as an assembly of four diverging transducers, spaced at 90° azimuth intervals from one another around the electronics housing. This transducer arrangement is known in the technology as the Janus configuration. A three beam system permits measurements of three velocity components, $V_x$, $V_y$ and $V_z$ (identified respectively as u, v, w in oceanographic literature) under the assumption that currents are uniform in the plane perpendicular to the transducers mutual axis. However, four beams are often used for redundancy and reliability. The current profiler system may be attached to the hull of a vessel, remain on stationary buoys, or be moored to the ocean floor as is a current profiler 100 shown in FIG. 2.

One class of current profilers now in use, so-called "pulse-incoherent" systems, measure mean current profiles over ranges of hundreds of meters. These pulsed sonars use a pulse-to-pulse incoherent method to derive current velocity. Profilers characterized by pulse-incoherent processing use the echoes from each pulse independently, measuring phase changes over a fraction of the pulse duration to determine the Doppler frequency shift, i.e., $f_D=\theta/T$, where θ is a phase change calculated from performing an autocorrelation on a received waveform at an autocorrelation lag T period. To avoid confusion it can be stated that the received signal is coherent during the short lag time over which phase change is detected; the term "incoherent" refers only to the fact that coherence need not be maintained between pulses.

Current profilers are subject to trade-offs among a variety of factors, including maximum profiling range and temporal, spacial (the size of the depth cell), and velocity resolution. Temporal resolution refers to the time required to achieve a velocity estimate with the required degree of accuracy. In typical applications, a current profiler will make a series of measurements which are then averaged together to produce a single velocity estimate with an acceptable level of velocity variance, or squared error.

For many applications, the resulting combination of profiling range and resolution is satisfactory to produce useful results. Often bias is more of a concern than the variance in observations. Bias is the difference between measured velocity and actual velocity. It is caused, for example, by asymmetries in band limiting system components. Measurement bias remains even after long-term averaging has reduced variance to a predetermined acceptable limit. For instance, bias dominance is typically found in measuring large-scale features such as those found at temperature and salinity interfaces.

For other applications, though, the range and resolution of pulse-incoherent systems is inadequate. These applications require the study of oceanic dynamics such as internal waves, small scale turbulence, sharp scale frontal regions delineating jets, meanders, and eddies. Using a visual analogy, the pictures produced of such structures by a pulse-incoherent system are two blurred to be of any use.

The primary limitations of existing pulse-incoherent systems are threefold. First, many seconds or minutes of averaging are required to produce acceptable statistical errors in mean velocity measurement. Second, for traditional applications, depth cell resolution is limited to one meter or greater. Third, small scale turbulence measurement is not possible due to fundamental limitations of incoherent echo processing, namely, because the turbulence produced velocities that change too quickly for the possible combinations of velocity variance and time to average measurements.

Conventional pulse-incoherent systems estimate the Doppler shift from either the pulse change per unit time or the shaft in spectral peak of a single pulse echo. The transmitted waveform is typically a periodic pulse train characterized by a pulse repetition interval (PRI). Thus, to provide for a round-trip visit (including echo time) to the particles, or scatterers, in a given depth cell, the maximum profiling range or depth is one-half the PRI times c. The received echoes are placed in memory bins defined by "time-gating" the receiving signals, i.e., echoes received at time $t_n$ come from scatterers located at a distance $\frac{1}{2}ct_n$. The width of the gate is usually matched to the pulse length, T, giving a range resolution of $\frac{1}{2}cT$. The velocity (v) of the scatterers in a particular cell is related to the Doppler shift $f_D$ by the following equation:

$$v=\tfrac{1}{2}\lambda f_D \quad (2)$$

where $\pi$ is the acoustic wavelength (for example, $\lambda$=0.5 cm at 300 kHz).

Pulse-incoherent systems are significantly affected by noise. A theoretical lower bound on the variance of the Doppler frequency estimate from a single pulse is given by the Cramer-Rao bound, which for an unbiased estimator is approximated by the following equation for the standard deviation ($\sigma_D$) of the Doppler frequency:

$$\sigma_D=(2\pi T)^{-1}(1+36/SNR+30/SNR^2)^{1/2} \quad (3)$$

where SNR is the signal-to-noise ratio of the Doppler shifted echo pulse. Applying equations (2) and (3), the corresponding error ($\sigma_r$) in the radial velocity (along the beam) estimate is given by the following equation:

$$\sigma_r=\tfrac{1}{2}\lambda(2\pi T)^{-1}(1+36/SNR+30/SNR^2)^{1/2} \quad (4)$$

Therefore, for a given carrier frequency, which depends on the transducer, the minimum velocity error per ping achievable is inversely proportional to the length of the transmitted pulse. It can be shown that the variance, or squared error, grows quadratically toward smaller SNR, and tends to a constant in the limit of zero noise (a large SNR). Thus, conventional pulse-incoherent Doppler systems perform well above an SNR of roughly 10 db where the variance is relatively constant.

Neglecting noise, it is evident that the product of range resolution, $\tfrac{1}{2}cT$, and velocity error per ping, $\sigma_r$ from equation (4), is proportional to the acoustic wave-length, $\lambda$, and is independent of the pulse length. This range resolution-velocity error trade-off is the most serious limitation of pulse-incoherent system, and is directly responsible for the widely recognized long averaging times required to control the absolute velocity error.

As an example of averaging time with a pulse-incoherent current profiler consider a 300 kHz carrier frequency profiling over a water column of 300 meters which is measured at depth cells of 1 meter, and pinging twice a second. Further assume a monostatic system wherein the transmitter and receiver circuits share the same transducer. The range resolution of 1 m means that the pulse length T is 1.33 ms. The velocity error per ping can be found from equations (1) and (2) to be about 30 cm/s. To reduce the standard deviation in the estimate of radial velocity to 1 cm/s, requires about $30^2$ or 900 pings, which at two pings per second requires that velocity estimates be averaged over about 7½ minutes.

Pulse-coherent Doppler current profilers have been developed which improve the velocity measurement accuracy over pulse-incoherent current profilers by a factor on the order of 100. These sonar systems profile current velocities over ranges of several meters, but they are seriously limited in application by small velocity dynamic ranges which are ultimately caused by velocity ambiguity effects inherent to pulse-coherent techniques.

For general transmit waveforms, the range-velocity uncertainty (defined by rearranging equation (4) such that the left-hand side of the equation is the product of $\sigma_r T$) is inversely proportional to the time-bandwidth product of the signal, determined by the signal decorrelation time (e.g., the time that the echo is in the water causing the echo to lose enough energy so that it can not be correlated with itself) and pulse bandwidth. Signal decorrelation time is related to equations (7–9) below as well as to a drop in the SNR due to noise. The basic premise behind the pulse-coherent approach is to increase this product by transmitting a series of short pulses, in which phase coherence is maintained over the transmitted sequence. The time between pulses is adjusted to minimize ping-to-ping interference. A given range cell is ensonified by successive pulses, so that after demodulation, the received signal (sampled by time-gating) is a discrete representation of the Doppler return from that particular range. The Doppler frequency of this signal can then be estimated by a variety of techniques, including spectral analysis, or the "pulse-pair" algorithm (see, e.g., "A Covariance Approach to Spectral Moment Estimation", Kenneth S. Miller and Marvin M. Rochwarger, IEEE Trans. Info. Theory, Sep., 1972).

Velocity error for independent pulse pairs has been analyzed. It can be shown that the pulse pair estimator is a maximum likelihood estimator (i.e., the estimator having the highest probability of being correct), and in the limit of large SNR, the Doppler velocity error per pair is given by the following:

$$\sigma_r=\tfrac{1}{2}\lambda\sigma_D=2^{3/2}\pi B \quad (5)$$

where B is the Doppler bandwidth in Hz. $(2\pi B)^{-1}$ is the decorrelation time, assuming a Gaussian correlation function $\exp(-\tfrac{1}{2}(2\pi\tau B)^2)$ where is time lag. Typical values of B imply an error per root ping (the square root of the variance per number of pings which are included in the average) between 0.1 and 2.5 cm/s, depending on conditions. In the more general case where successive pairs are correlated, the velocity error is a complicated function of pulse spacing, Doppler bandwidth, and the signal to noise ratio.

Since a transmit pulse need only contain a few cycles of the carrier, range resolutions on the order of 5–10 cm are easily attainable (for example, 10 cycles at 300 kHz corresponds to a 2.5 cm pulse length, where the velocity is calculated as c/2 to account for round-trip time). However, despite their outstanding range resolution capabilities, because pulse-coherent systems are sampled, velocities are aliased about the Nyquist frequency of the sampling. This means that samples $2\pi$ radians apart in phase are indistinguishable, which leads to the well-known "range-velocity" ambiguity presented in the equation below:

$$R_{max}V_{max}=\pm\lambda c/8 \quad (6)$$

where $R_{max}$ is the maximum profiling range of the system and $V_{max}$ is the maximum velocity resolution. Thus, for a given transmission frequency and desired velocity resolution, a pulse-coherent system is limited in profiling range. Although the ambiguity can be improved by using a non-periodic pulse tram, experience has shown that a factor of order five improvement is a practical limit. As a consequence, conventional pulse-coherent systems have been limited to relatively short ranges, of order tens of meters.

As is well-known in the technology, the autocorrelation function is used to measure the dependence of a received waveform at time t with the received wave-form delayed by a lag time, and the result is used in calculating the Doppler frequency. In pulse-incoherent Doppler, the correlation time of the signal is primarily determined by the pulse width. Pulse-coherent systems, besides being dependent on pulse width, are also sensitive to various changes in scatterer movement. These phenomenon cause a narrowing of the autocorrelation function, or equivalently, a broadening of the Doppler spectral peak. There are three principal sources of spectral broadening: finite residence time, turbulence within the sample volume, and beam divergence.

With respect to residence time between successive pulses some particles will have moved out of the sample volume while new particles will have been introduced. Since the new particles enter with random phases, the signal will completely decorrelate over a "residence time" of order d/U, where d is a measure of the size of the range cell, and U is the relative velocity between the beam and the scatterers.

Another source of spectral broadening is sample volume turbulence. Turbulent eddies with spatial scales on the order of the sample volume or smaller cause the scatterers to have a distribution of velocities.

Finally, beam divergence contributes to spectral broadening. This effect is analogous to the turbulence broadening except that the diversity in scatterer velocity within the sample volume is caused by the small variation across the beam of the angle between the velocity vector and the normal to the transducer.

The contributions of these three effects to the Doppler spectral broadening can be estimated as follows:

$$B_r=0.2\ |u|/d \quad (7)$$

$$B_t=2.4(\epsilon d)^{1/3} \quad (8)$$

$$B_d=0.84\ \sin(\Delta\theta)u_c/\lambda \quad (9)$$

where d is the half-power scattering volume width, |u| is the magnitude of the relative velocity between the beam and the scatters, $\epsilon$ is the turbulent energy dissipation rate, $\Delta\theta$ is the two-way, half-power beamwidth, and $U_c$ is the cross-beam velocity component. The total Doppler bandwidth (B) is the root-mean-square (RMS) of the individual contributions: $B=(B_r^2+B_t^2+B_d^2)^{1/2}$.

In summary, pulse-coherent systems are hampered by a limited profiling range, often just tens of meters. Further, interference between the transmit pulses creates instability: instability to the point where the system produces either very, good or very bad velocity measurements with no in-between.

Accordingly, an acoustic Doppler current profiler overcoming limitations such as those described above would readily find application over the entire range of shipboard, fixed-mounted, and moored deployments. Among the possible applications is that of weather prediction wherein the dynamics of cold and warm water mixing remains a difficult and important problem requiring greater spatio-temporal resolutions for large profiling ranges.

In addition, an entirely new set of short spacial and temporal current measurement scales would be made accessible to remote sensing instruments. These measurement include internal waves, small scale turbulence, sharp scale frontal regions, delineating jets, meanders, eddies, and other large scale structures in the ocean. An improved current profiler would achieve a current profiling range comparable to that of existing incoherent acoustic Doppler profilers, but realize a factor of about 100 improvement in the variance of single-pulse velocity estimates.

Lastly, it would be desirable to provide a current profiler with a fast velocity response, i.e., a decrease in averaging time. Such a fast response will improve horizontal spacial resolution if the current profiler is mounted on a moving ship. For example, a current profiler which could average velocity measurements over one-tenth of a mile in the time now required to average over five miles would be a valuable improvement over present technology.

SUMMARY OF THE INVENTION

The above-mentioned needs are satisfied by the present invention which includes a system and method for measuring velocities using coded-pulse broadband acoustic signals. The present invention allows greater range-velocity resolutions over greater profiling ranges with less velocity averaging time than has heretofore been achieved. The present invention samples quadrature components of a received signal which are used to calculate phase change over a time interval as a Doppler frequency. One or more relative velocity components can be transformed into absolute velocity components using fixed earth reference coordinates.

The present invention includes a velocity measuring system comprising a transmitting transducer for producing a beam pointing in a direction along which a phase change is measured. The velocity measuring system further pulse transmission means for providing a pulse tram to the transmitting transducer, the pulse train comprising at least first and second emitted pulses having a predetermined pulse separation. The velocity measuring system also includes a means for complex sampling an echo return of the emitted pulses received by a receiving transducer so as to provide a first set of complex samples. In addition, the velocity measuring system includes a means for delaying the first set of complex samples by a selected time lag thereby producing a second set of complex samples. The velocity measuring system also includes a means for computing a measured value of complex correlation using at least a portion of the first set of complex samples and at least a portion of the second set of complex samples. Lastly, the velocity measuring system includes a means for deriving a velocity component from the complex correlation.

Another aspects of the present invention is coding each pulse using a technique such as phase coding. One preferred embodiment uses 0° and 180° phase codes. The pulses may have a lag time that is equal to the pulse length. Also, the lag time may include a time interval when the transducer is not transmitting.

To measure multiple orthogonal velocity components a number of transducers may be configured in either monostatic or bistatic configurations. In a current profiler embodiment, the beam produced by each transducer is an acoustic, signal and a plurality of velocity measurements are made over a plurality of depth cells so as to form a current profile of a water column. Amplitude measurements may also be made so as to determine backscatter strength, particle concentration and particle flux.

These and other objects and features of the present invention will become more fully apparent from the following description and appended claims taken in conjunction with the accompanying drawings.

BRIEF DESCRIPTION OF THE DRAWINGS

FIG. 1a is a scatter diagram of an exemplary current profile showing the East velocity vector plotted as a function of depth;

FIG. 1b is a scatter diagram of an exemplary current profile showing the North velocity vector plotted as a function of depth;

FIG. 2 is a perspective view of a current profiler, having a Janus configuration of transducers, moored to the ocean floor;

DETAILED DESCRIPTION OF THE PREFERRED EMBODIMENTS

Figure 3:
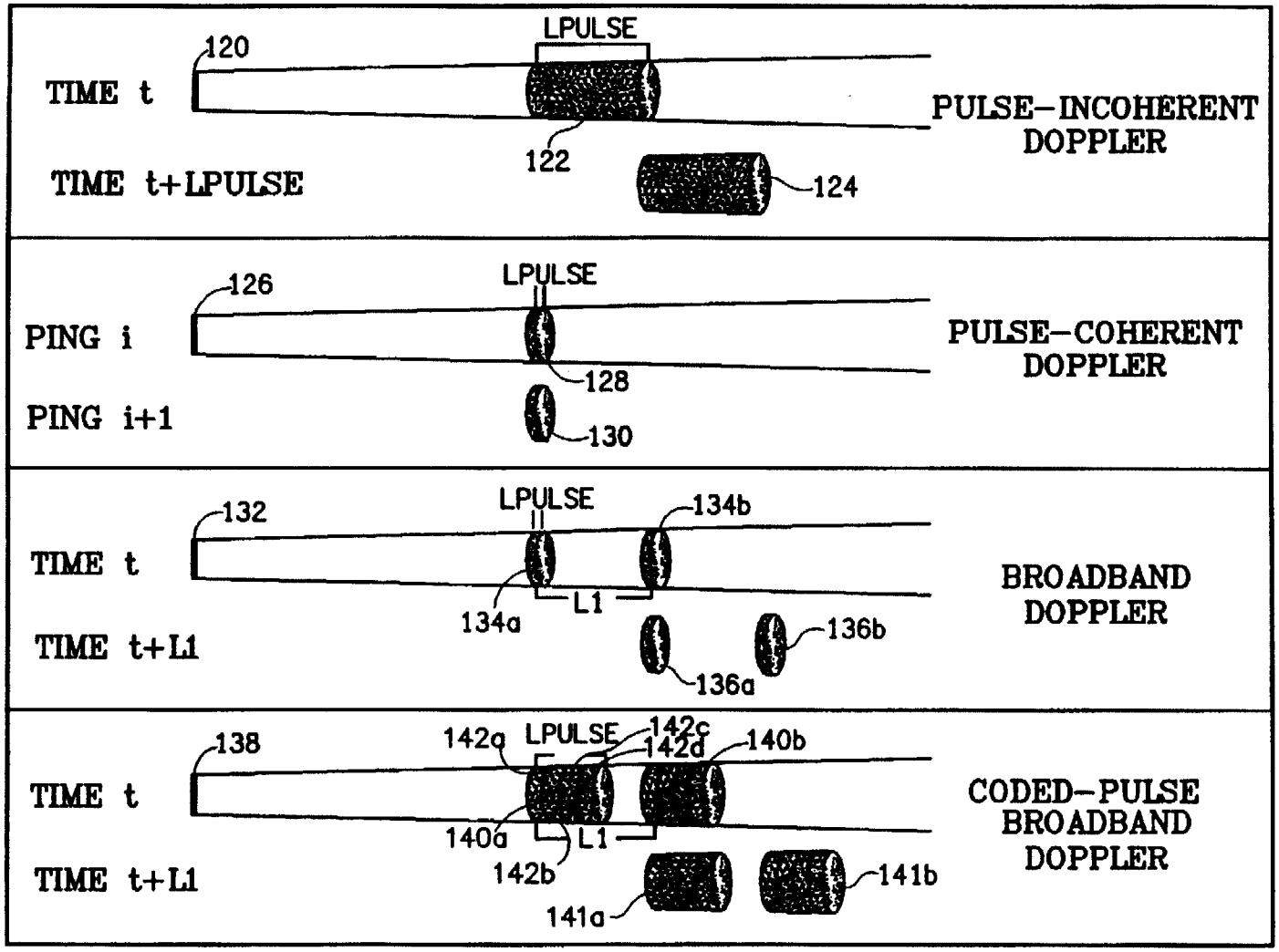
FIG. 3 is a pulse diagram providing a comparison between the pulses transmitted by various current profilers including a pulse-incoherent Doppler system, a pulse-coherent Doppler system, a broadband Doppler system and a coded-pulse Doppler system, the latter two belonging to the present invention.

Reference is now made to the drawings wherein like numerals refer to like parts throughout.

FIGS. 1a and 1b were introduced in the "Backgound of the Invention" section above. The exemplary current velocity profile depicted in the scatter diagrams of FIGS. 1a and 1b is the type of information that is also the objective of the current profiler of the present invention. However, the present invention provides greater accuracy in current velocity measurements, at greater ranges, than has heretofore been possible.

FIG. 2 illustrates a current profiler 100 which is semipermanently moored to the ocean floor 102. In this type of profiler deployment, a record of current profiles is typically stored in a non-volatile memory (not shown) located inside the current profiler 100.

The current profiler 100, as shown in FIG. 2, generates a set of acoustic beams 104a,b,c,d which emanate from transducers. The current profiler 100 is upward looking, that is, the acoustic beams 104 are directed vertically towards the ocean surface. Each beam 104 "illuminates" a water column which can be decomposed into horizontal dices known as range, or depth, cells such as the cell indicated at 106. By appropriate transmission and reception of sound pulses, the phase shift between pulse echoes is calculated. The phase shift is then step-by-step transformed into a Doppler frequency, a velocity along the beam 104, and then one or more orthogonal current velocity components such as those indicated at 108a,b. The current, profiler 100 may be deployed in other ways than that shown in FIG. 2 including, for example, various combinations of downward, upward or other angled looking, on fixed or moving platforms, or on surface, bottom, or mid-depth moorings.

FIG. 3 presents in schematic form a number of different Doppler measurement techniques used in acoustic Doppler current profilers (ADCPs), including the broadband Doppler and coded-pulse broadband Doppler methods of the present invention. In the first technique, a pulse-incoherent ADCP transducer 120 is shown generating a pulse 122 at a time t. The single transmitted pulse 122 is sized to match the associated depth cell. After passing through a depth cell, the pulse 122 is shown at a time t plus a time equal to the length of the pulse (Lpulse), having moved to a new location as indicated at 124.

The pulse 122 may generate an echo (not shown) at each depth cell depending upon the density of scatterers at each depth. Measurement of current velocity at the desired depth cell is based upon a predetermined lag time between transmission of the pulse and reception of the desired echo. A pulse-incoherent ADCP measures current velocity by measuring the Doppler shift in the frequency of the returning echo. The Doppler frequency is indirectly calculated from the difference in phase between two different samples of the received signal.

In FIG. 3, a pulse-coherent ADCP Transducer 126 is shown emitting a pulse 128. The pulse 128 is a shorter duration (greater depth resolution) than the pulse 122 of the pulse-incoherent system. Like the pulse-incoherent Doppler system, the echo from each single pulse is allowed to return to the transducer 126 before the next pulse 130 is transmitted. However, unlike a pulse-incoherent system, the fundamental measurement of a pulse-incoherent system is the phase change between two successive echoes at the same depth.

FIG. 3 also illustrates pulses that are generated by a broadband ADCP transducer 132 of the present invention. The broadband method differs from either the pulse-incoherent or pulse-coherent methods in that the broadband method utilizes two (or more) pulses in the beam (or the equivalent thereof) at the same time such as the pulses indicated at 134a and 134b. In FIG. 3, the pulses are separated by a lag time, L1, equal to the pulse separation. After traveling some distance and echoing back to the transducer 132, the phase change between the pulse echoes at the same range is measured using an autocorrelation function.

Unlike the pulse-coherent method, the maximum profiling range of the broadband current profiler is not limited to the pulse repetition interval. The pulse length, or width, is typically much shorter than the depth cell size which results in a large time-bandwidth product (hence the term "broadband").

The present invention also includes a coded-pulse broadband ADCP which is characterized by pulses shown in FIG. 3. A transducer 138 generals a pulse pair 140a,b that propagates through the water as shown, for example, by the later pulses 141a,b. Each pulse 140 includes four equal-sized code elements 142a,b,c,d that each comprise one or more cycles (or portions thereof) of the transmitted acoustic waveform. The code elements 142 represent phase codings such that each element is either at 0 or 180 degrees of phase. While only two coded-pulses are shown in FIG. 3, the method can be generalized to include more than two pulses.

For a coded-pulse ADCP, measurement of phase change is identical to that of the broadband method previously discussed. In addition, however, the pseudo-random phase coding is applied to the pulses allowing longer pulses to be used without decreasing the band-width. Longer pulses increase the echo power thus delaying the signal decorrelation to greater ranges and extending the useful profiling range of the system. The coded pulses may be as large as the size of the depth cell. If the pulse separation or lag time L1 is equal to the pulse length, the pulses are combined into a single, continuous-coded transmission.

Figures 4A, 4B, 4C:
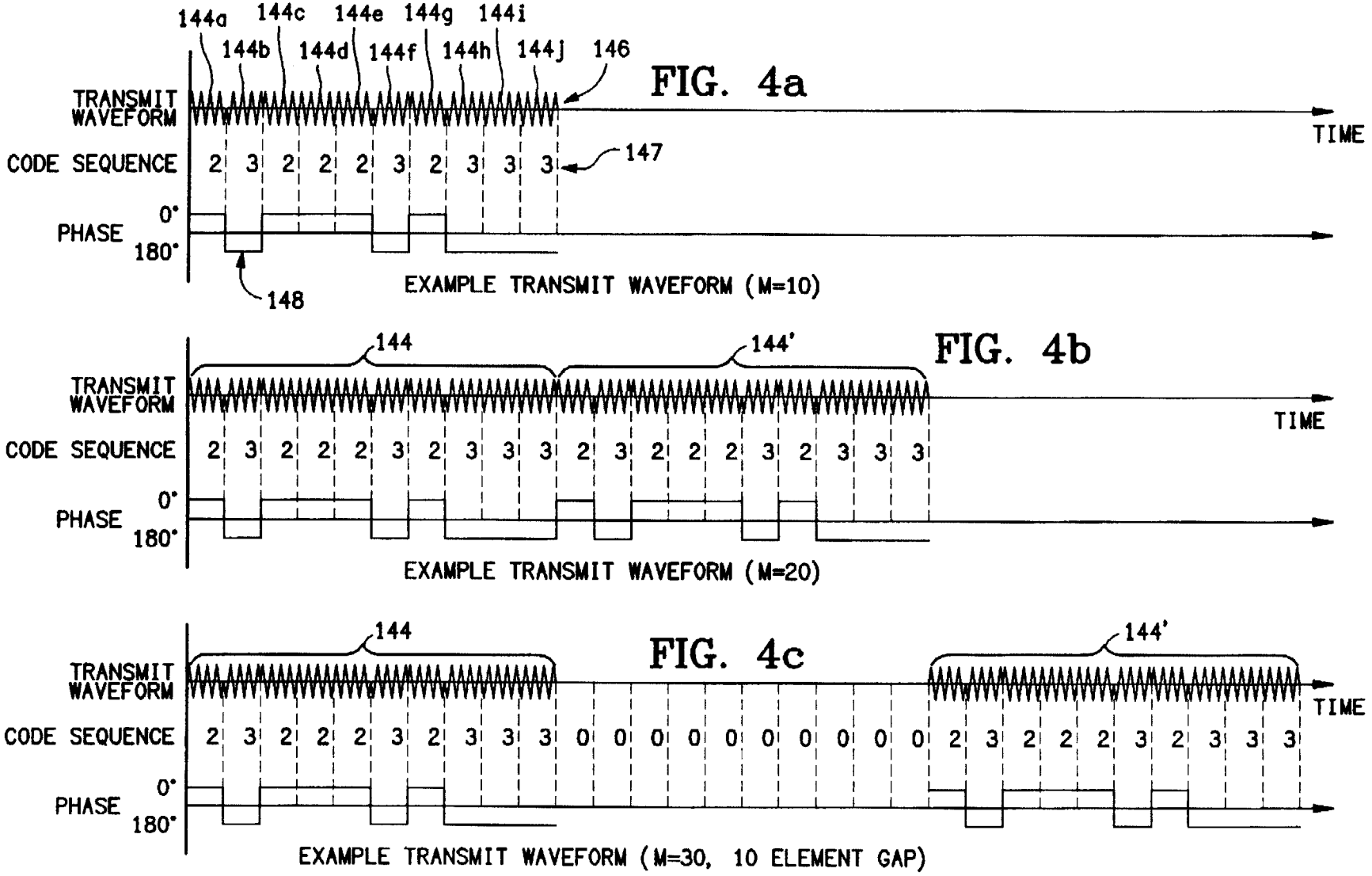
FIGS. 4a,b,c are sets of coded-pulse diagrams illustrating exemplary transmission codes of the present invention.

FIG. 4 shows three examples of "ideal" coded pulses having different length that may be generated by the coded-pulse broadband system of the present invention. Each diagram (FIGS. 4a,b,c) corresponds to one pulse, or ping. The actual waveforms that are injected in the water are somewhat different than those portrayed in FIG. 4 due to the finite bandwidth of the transducers and the power amplifier. Therefore, in the corresponding actual waveforms there is a short recovery time after phase reversals.

FIG. 4a includes three different representations of a sequence of code elements generally indicated at 144a–j. The first code representation is a transmit waveform generally indicated at 146. Each code element 144 is a collection of four cycles of the carrier signal. Phase shifts of 180 degrees my occur between code elements 144 as, for example, shown by the transition between the code elements 144a and 144b. The exemplary pulse of FIG. 4a has M=10 code elements 144 wherein the first five code elements 144a–e are inverted and repeated by the last five code elements 144f–j so as to essentially combine two pulses in the continuous waveform 146. Inverting a second pulse, such as code elements 144f–j, may be useful in reducing noise bias.

Thus, for the waveform 146, an autocorrelation function (as is further discussed below) is performed on the first five elements 144a–e and the last five elements 144f–j after inversion using a lag time equal to the time to transmit five code elements. In the typical case, the number of code elements for a particular application will be matched to the size of the depth cell.

The pulse coding can also be represented in binary form as shown by a code sequence generally indicated at 147 in FIG. 4a. The code sequence 147 is based on each code element 144 being deemed by two bits. The two bit code is shown in Table 1 below.

TABLE 1

| $B_1$ | $B_0$ | Phase |
|---|---|---|
| 0 | x | off |
| 1 | 0 | 0 degrees |
| 1 | 1 | 180 degrees |

In Table 1, the most significant bit ($B_1$) indicates whether the transmitter is on (1) or off (0) for the duration of the code element 144. The least significant bit ($B_o$) indicates the phase, 0°(0) or 180°(1), of the code element 144. The character "x", in Table 1, is a "don't care" state.

The code sequence 147 shows the decimal equivalent of the binary code. The code element 144a, for example, is defined in the code sequence 147 as "2" meaning that the transmitter is on and the code element 144a is 0 degrees phase. A phase waveform 148 presents the same fundamental information as the transmit waveform 146 and code sequence 147 but it is expressed in the form of a square-wave.

FIG. 4b shows a coded-pulse that differs from that of FIG. 4a in that the pulse is twice as long (M=20). The first ten code elements 144 of the pulse in FIG. 4b are the same as the code elements 144 of FIG. 4a. The last ten code elements 144' are simply a repetition of the first ten. Thus, the two pulses 144, 144' are combined in a single transmit waveform having a lag time equal to the time to transmit ten code elements.

FIG. 4c shows a coded-pulse that differs from that of FIG. 4b in that the pulse is longer (M=30) due to a ten code element dead-time placed between the two sets of ten transmitted code elements 144, 144'. Thus, the lag time is equal to twenty code elements. The error in the Doppler frequency is inversely proportional to the pulse separation. The range resolution is determined by the length of the coded pulse.

In a presently preferred embodiment of the velocity measurement system, the code is carefully chosen so as to eliminate a from central peak and sidelobe noise in the autocorrelation function. Central peak noise is effectively eliminated by inverting the second pulse, e.g., as shown in FIG. 4a in half of the transmitted pings. The following steps are taken to eliminate sidelobe noise: (1) a code is used that has zero autocorrelation at one lag time to each side of the sidepeak (where phase measurements are made), (2) a code is used that has minimal sidelobes near the sidepeak, which are arranged symmetrically around the sidepeak, and (3) pairs of complementary, or Golay, codes are used on successive pings so that biases will cancel with averaging.

The pulse separation, or lag time L1, determines accuracy of range-velocity resolution with shorter lag time meaning grater resolution. It is even possible to make the lag time less than the length of a single coded pulse by transmitting pulses that overlap in one or more code elements. For example, using letters of the alphabet to represent code elements, the sequence "ABABA" would allow two pulses "ABA" having a length of three code elements to be transmitted with a lag time equal to the time to transmit two code elements.

A skilled technologist will thus understand and appreciate that there are trade-offs in choosing the proper code, code length and pulse separation of a multi-pulse waveform that will depend on the particular application of the present invention.

Hereinafter, both the broadband ADCP and coded-pulse broadband ADCP systems and methods will generally be referred to as the broadband ADCP unless otherwise indicated.

Figure 5:
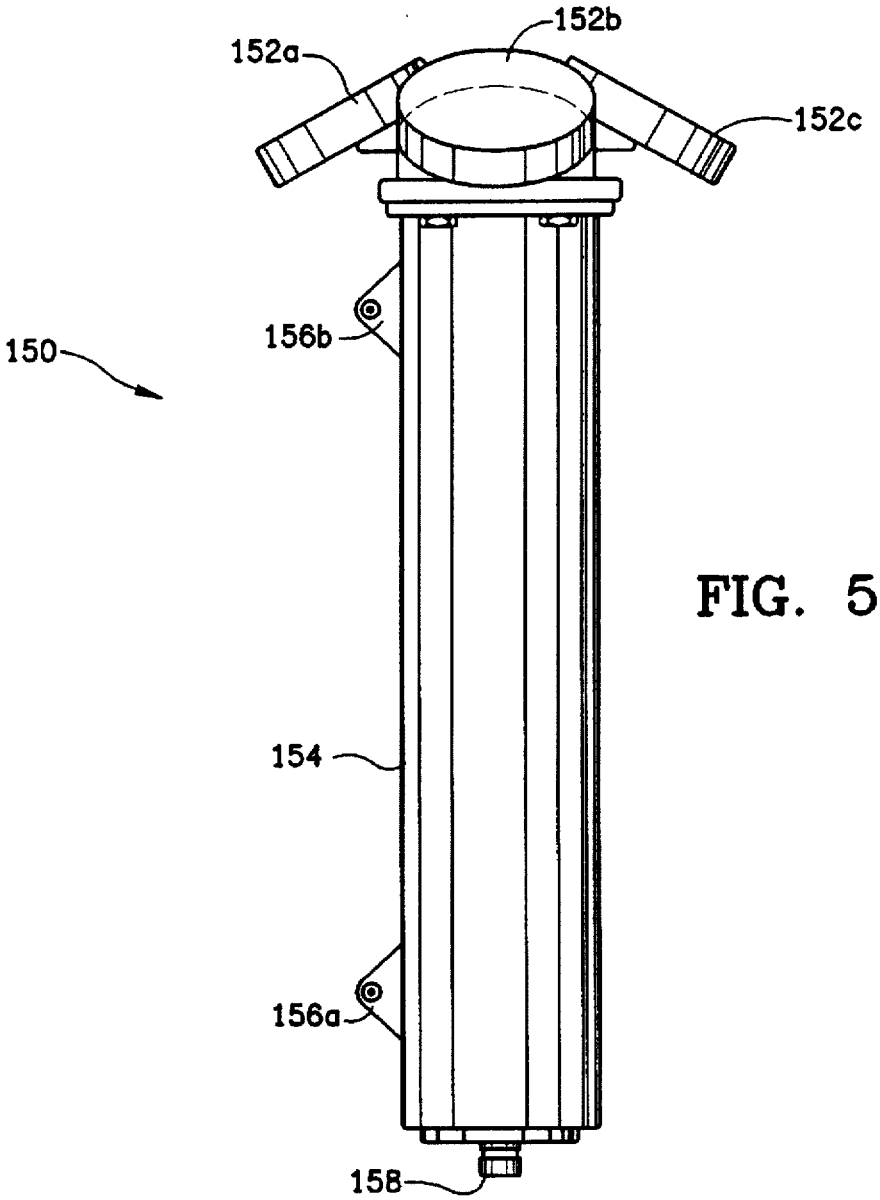
FIG. 5 is a side elevational view of one preferred mechanical assembly for a current profiler of the present invention.

FIG. 5 shows a mechanical assembly, generally indicated at 150, that houses and protects the electronics (FIG. 7) necessary to implement the broadband ADCP of the present invention. The mechanical assembly 150 includes a set of four transducers 152a,b,c,d arranged in a Janus configuration. The mechanical assembly 150 may, of course, host other numbers and configurations of transducers than the four transducers shown in FIG. 5. The transducers 152 include piezoelectric ceramic plates that are encapsulated in a protective covering of various materials.

Figure 6:
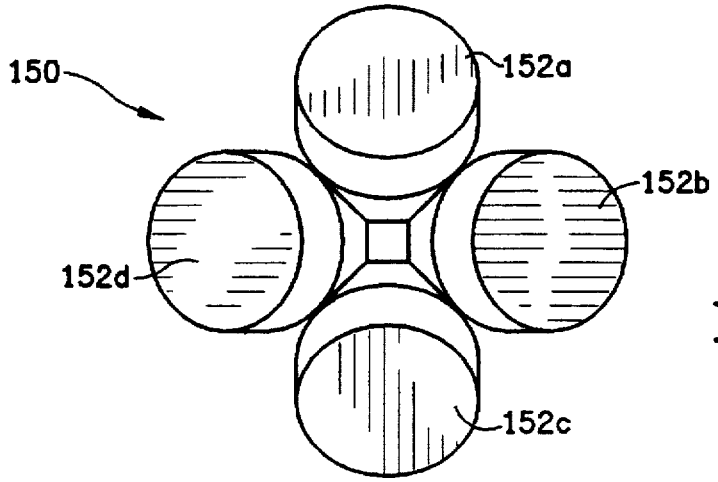
FIG. 6 is a top plan view of the current profiler shown in FIG. 5.

The transducers 152 are typically manufactured so that each operates at a particular frequency chosen from a suitable range of frequencies such as, for example, 75, 150, 300, 600 and 1200 kilohertz. Low-frequency transducers are commonly used in open ocean applications where a long profiling range is desirable. High-frequency transducers, on the other hand, are used in shallow water applications where depth resolution, as characterized by the size of a depth cell, and finer spatial and temporal scales are important. The transducers 152 are manufactured to be easily substitutable on the current profiler assembly 150 so that the proper acoustic frequency can be used to achieve the desired combination of profiling range and velocity resolution, which may vary from one velocity profiling experiment to another. A top plan view of the transducers 152 is illustrated in FIG. 6.

In FIG. 5, the transducers 152 are connected to one end of a cylindrical pressure vessel 154 whereto acoustic transmitting, receiving and processing electronics are contained. The transducers 152 are positioned at 90°intervals of azimuth around the periphery of the pressure vessel 154 in a Janus configuration. To achieve multiple degrees of freedom in calculating orthogonal components of velocity, the transducers 152 are canted outward from the longitudinal axis or the pressure vessel 154. The mechanical assembly 150 is conveniently positioned in the water by connecting one or more cables and/or buoys to a pair of mounting lugs 156a,b located on the side of the pressure vessel 154.

An I/O connector 158 is located at the other end of the pressure vessel 154. The I/O connector 158 is connected to a transmission cable (not shown) for measurements wherein post-processing of current profiles in real-time is desired. Otherwise, the current velocities may be stored on a recording media (not shown) such as, for example, magnetic tape or electrically erasable programmable read-only memory (EEPROM), optionally configured in the electronics of the pressure vessel 154.

Figure 7:
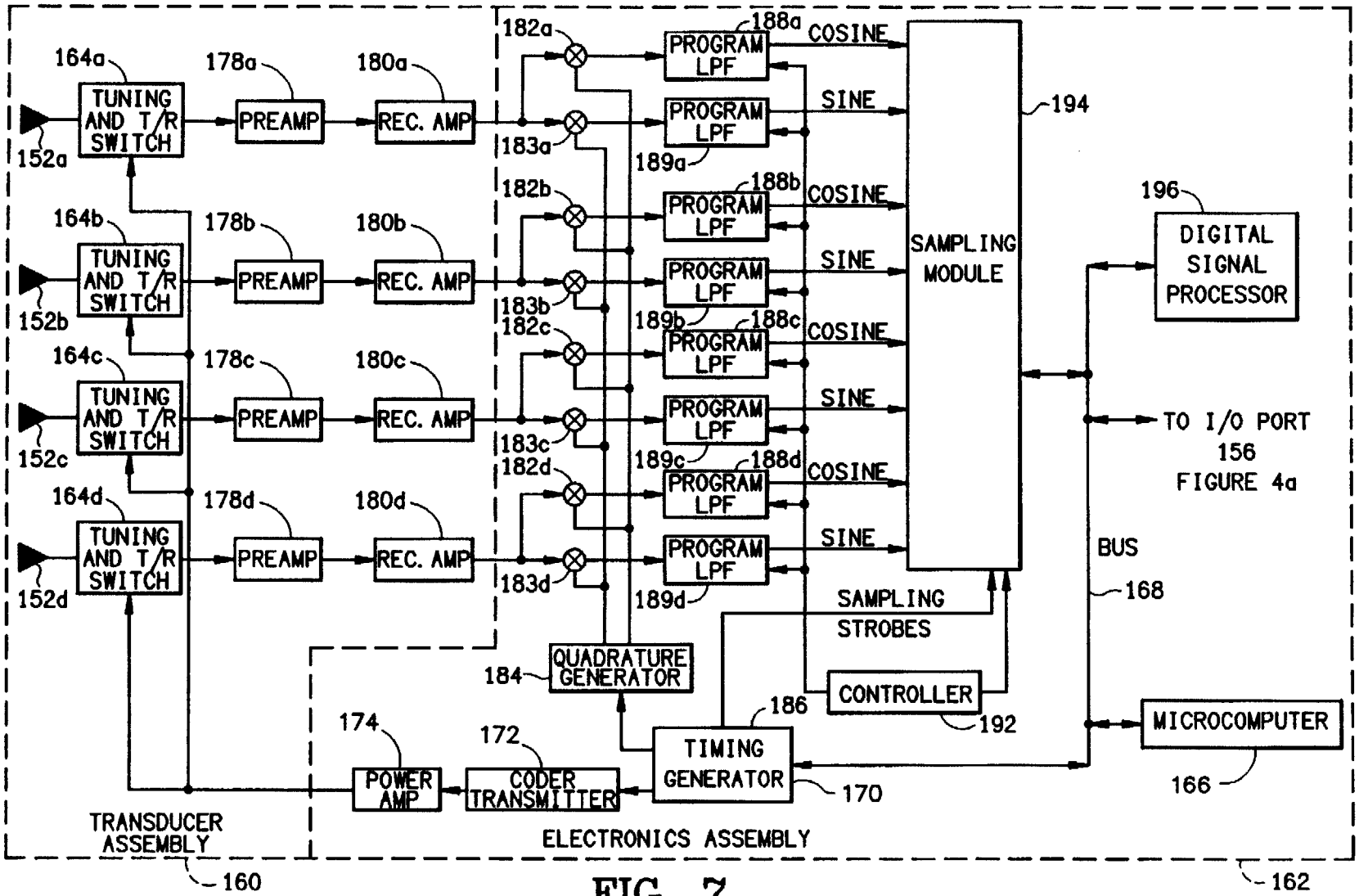
FIG. 7 is a block diagram of one preferred embodiment of the electronics for a current profiler of the present invention.

With reference now to FIG. 7, a block diagram shows a presently preferred embodiment of the electronics in the coded-pulse broadband ADCP. The electronics can be functionally partitioned into a front-end transducer assembly 160 that receives acoustic signals, and an electronics assembly 162 that coordinates transmitting and receiving, and performs signal processing. Because the transducer assembly 160 is specifically matched to the transducers 152, whenever the transducers 152 are changed, the entire transducer assembly 160 is replaced.

Referring First to the transducer assembly 160 shown in FIG. 7, the transducers 152 are each electrically connected to one of a set of tuning and transmit-receive (T/R) switch circuits 164a,b,c,d. In the presently preferred embodiment of the tuning section of the circuit 164, the primary to a transformer (not shown) is connected to the two leads of the transducer 152 to resonate out the capacitance of the transducer. One side of the transformer secondary is connected to a series LC circuit (not shown) that is tuned to the frequency of the transducer 152. This forms the tuning section of the circuit 164.

A circuit comprising a diode network and transmitter transformer (not shown) is used to cancel the effect of the capacitor in the LC circuit allowing the transmission signal to be fed to the transducer 152. The transmit/receive section of the circuit 164 thus allows the transducers 152 to either receive or transmit pulses at any given time. It will be recognized by one skilled in the relevant technology that although the embodiment of the broadband ADCP shown and described herein is a monostatic system, requiring time-sharing of a single set of transducers, a bistatic implementation is also possible that would not require a transmit-receive section in the circuit 164.

A coded-pulse transmission is initiated by a microcomputer 166. In one presently preferred embodiment, the microcomputer 166 includes a CMOS 68000 microprocessor available from a number of vendors including Motorola. A user specifiable set of parameters, including the number of cycles per code element and the code length, is stored in a ROM in the microcomputer 166. The microcomputer 166 transfers the waveform specific parameters across a digital bus 168 to a timing generator 170. Under the control of the microcomputer 166, the timing generator 170 controls a coder transmitter 172 to generate the appropriate pair of coded-pulses, including dead-time. The coded-pulses are amplified by a power amplifier 174 and are eventually transmitted into the water by the transducers 152 as a coded acoustic waveform.

During some user specified blanking interval, when no pulses are transmitted, echo pulse received from the transducers 152 are fed from the tuning and T/R switch circuits 164 to a set of preamplifiers 178a,b,c,d. In a preferred embodiment, the preamplifers 178 are differential amplifiers having one side of the amplifier 178 tied to ground. The received signal, which is the sum of the transmitted signal and noise, is amplified by the differential amplifier. The amplified signals are fed from the preamplifers 178 to a set of receiver amplifiers 180a,b,c,d. The preamplifers 178 allow the gain of the combined amplifier set 178 and 180 to be accurately controlled although another embodiment could combine the two amplifiers 178, 180.

In one preferred embodiment, the receiver amplifiers 180 each include a Signetics SA604A semiconductor chip. Although designed for intermediate frequency conversion applications, the two amplifiers (not shown) of the SA604A chip happen to operate over the anticipated frequency range of the current profiler. The amplifiers are connected in series to the output of each preamplifier 178. The signal strength of the echo is also made available to the system by the receiver amplifiers 180, for example, from the pin 5, RSSI output of the SA604A chip. In one preferred embodiment, the signal strength is digitized and recorded for later processing.

The signal strength signal can be calibrated for use in measuring backscatter strength, particle concentration and particle flux. For example, one application of this type of measurement is in dredging operations where signal strength is used in determining sediment concentration and vertical flux in plumes created by dumping spoil.

The output signals of the receiver amplifiers 180 are fed to a set of in-phase mixers 182a,b,c,d and a set of quadrature mixers 183a,b,c,d. The mixers 182, 183 form the product of the received signal and the output of the quadrature generator 184. More specifically, the mixers 182, 183 are used to heterodyne the received signal so as to translate the carrier signal into a DC signal (where the carrier signal includes an in-phase [cosine] and quadrature [sine] signal, collectively called quadrature signals). In the present embodiment, the mixers 182, 183 are implemented as two 74HC4053 triple two-channel analog multiplexer/demultiplexer chips such as those supplied by Signetics. The quadrature signals are received by the mixers 182, 183 from a quadrature generator 184.

The quadrature generator 184, of the preferred embodiment, comprises a pair of D flip-flops (not shown) that are connected in series. The inverted output Q' of second flip-flop is fed back into the input D of the first flip-flop. In operation, the quadrature generator 184 receives an oscillator signal from the timing generator 170. The oscillator signal is fed into the clock input of two D flip-flops. The in-phase signal is thus sampled from the inverted output Q' of the second flip-flop and the quadrature signal is sampled from the noninverted output Q of the first flip-flop. The quadrature signals are then fed from the quadrature generator 184 to the mixers 182, 183.

The mixers 182,183 feed their respective amplified quadrature signals to a set of programmable low-pass filters 188a,b,c,d and 189a,b,c,d. The low-pass filters 188 are programmed by a controller 192 to pass the sideband frequencies, e.g., up to 20% of the easier frequency, corresponding to the phase modulation of the coded pulse. The filtered quadrature signals output from the low-pass filters 188, 189 (labeled as cosine and sine channels) are fed into a sampling module 194 which is discussed in more detail below with reference to FIG. 8.

The function of the sampling module 194, in FIG. 7, is controlled by the controller 192 and the timing generator 170. A receive cycle is initiated by the timing generator 170 at a time after the last element of a code sequence, e.g., the code elements 144 (FIG. 4), has been transmitted. After a user programmable delay, to permit the recovery of the receiver electronics in the transducer assembly 160, the timing generator 170 produces a train of sampling strobes that trigger analog-to-digital converters in the sampling module 194. In the preferred embodiment, the sampling module 194 outputs four samples of four bits of digit data per word (16 bits) transferred across the digital bus 168. This is so since the sampling module 194 is allocated on two separately addressable boards, each board servicing two of the transducers 152. Thus, each sample bit corresponds to one sample of one quadrature component of the waveform received by one of the four transducers 152. The digital data is transferred to a digital signal processor (DSP) 196 across the digital bus 168. In the preferred embodiment, the digital bus 168 is a custom, asynchronous bus having sixteen data lines (BD0–BD15) and twelve address lines (BA1–BA12). The preferred digital bus 168 can transfer data at speeds up to 400 ns per word which is primarily limited to the transfer rates of the DSP 196 and microcomputer 166.

The DSP 196 calculates the autocorrelation function (R(h)) of the received signal at a predetermined lag corresponding to the number of code elements in the first pulse. To calculate this function the DSP 196 applies the following equation, independently, for each of the four cosine-sine pairs output by the sampling module 194:

$$R(h) = \sum_j S_j S^*_{j+h} = \sum_j [\text{cosine}_j \text{cosine}_{j+h} + \text{sine}_j \text{sine}_{j+h} + \text{cosine}_{j+h} + \text{sine}_j i - \text{cosine}_j \text{sine}_{j+h} i] \quad (10)$$

where h is a predetermined lag represented by an integer sample number;

j is integer sample numbers within a depth cell of interest;

cosine and sine is data sampled from cosine and sine channels (such as from the low-pass filters 188, 189 in FIG. 7)

$i=(-1)^{1/2}$;

$S_j=\cos_j+\sin_j i$; and

S* denotes the complex conjugate of S.

As an example of this calculation, consider Table 2, below, having the set of cosine-sine samples numbered 123 to 139 for a given depth cell and lag h=3. (In this example it is assumed, only for the purpose of simplifying calculations, that the sample number, j, and the angle, in radians, of the cosine-sine sample at time j, are one and the same.) The "cosine" and "sine" columns contain data representing analog values that could be output by the sampling module 194. The "products" columns contain the products as defined in the summation of equation (10).

TABLE 2

| Sample | | | Products | |
|---|---|---|---|---|
| Number | Cosine | Sine | Real | Imaginary |
| 123 | −0.88796 | −0.45990 | −0.98999 | 0.141120 |
| 124 | −0.09277 | −0.99568 | −0.98999 | 0.141120 |
| 125 | 0.787714 | −0.61604 | −0.98999 | 0.141120 |
| 126 | 0.943984 | 0.329990 | −0.98999 | 0.141120 |
| 127 | 0.232359 | 0.972630 | −0.98999 | 0.141120 |
| 128 | −0.69289 | 0.721037 | −0.98999 | 0.141120 |
| 129 | −0.98110 | −0.19347 | −0.98999 | 0.141120 |
| 130 | −0.36729 | −0.93010 | −0.98999 | 0.141120 |
| 131 | 0.584208 | −0.81160 | −0.98999 | 0.141120 |
| 132 | 0.998590 | 0.053083 | −0.98999 | 0.141120 |
| 133 | 0.494872 | 0.868965 | −0.98999 | 0.141120 |
| 134 | −0.46382 | 0.885924 | −0.98999 | 0.141120 |
| 135 | −0.99608 | 0.088368 | −0.98999 | 0.141120 |
| 136 | −0.61254 | −0.79043 | −0.98999 | 0.141120 |
| 137 | 0.334165 | −0.94251 | | |
| 138 | 0.973648 | −0.22805 | | |
| 139 | 0.717964 | 0.696080 | | |

For example, the real product shown opposite the sample number j=123 is obtained as follows:

$$\text{cosine}_{123}\text{cosine}_{126} + \text{sine}_{123}\text{sine}_{126} = (-0.88796)(0.943984) + (-0.45990)(0.329990) = -0.98999$$

Note that for a first product j+h=126. There is no samples beyond j=139. Therefore, products beyond j=136 cannot be calculated since, at those samples, j+h is greater than 139.

After the products are calculated they are summed and output by the DSP 196. For example, using the products in Table 2, the output value is −13.8598+1.975680i. In the presently preferred embodiment, resolution has been sacrificed for speed and each sample value is represented by one bit. However, it can be shown that only half the information available in the cosine-sine information is lost by using this method.

In this way, the DSP 196 can perform a fast multiply by exclusive-oring two 16-bit data words received from the cosine-sine channel via the sampling module 194. The digital representation of (0,1) is interpreted by the DSP 196 as (−1,+1). Once the multiplies are performed, the summation of products is accomplished using a look-up table stored in EPROM. The presently preferred configuration of the DSP 196 makes use of Texas Instruments TMS320E15 16-bit, digital signal processor chip.

The complex number representation of each autocorrelation result is transferred from the DSP 196 across the digital bus 168 to the microcomputer 166. For linear systems, the Doppler frequency $f_D$ is calculated as follows:

$$f_D = \frac{\tan^{-1}(I/R)}{2\pi hT} \quad (11a)$$

where $f_D$ is the Doppler frequency of the echo;

I is the imaginary part of the complex number;

R is the real part of the complex number;

h is the lag used to calculate the autocorrelation; and

T is the time between samples.

For a hardlimiting system, such as the one shown and described herein, the microcomputer 166 uses the following Doppler frequency equation:

$$f_D = \frac{\tan^{-1}(\sin[\pi I/2]/\sin[\pi R/2])}{2\pi hT} \quad (11b)$$

In addition, the microcomputer 166 uses normalized values of I and R in equation (11b) by dividing each by the autocorrelation at zero lag, i.e., the normalized autocorrelation function must be used. Note that for linear systems the normalization step cancels in the division I/R and therefore is unnecessary. In one alternative embodiment, the microcomputer 166 calculates orthogonal velocity components based on equation (11) and then translate these velocities to earth reference values, e.g., subtracting out the components of velocity generated by the ship. In another embodiment, the Doppler frequency and/or other intermediate calculations can be forwarded to a conveying vessel via the I/O port 158 (FIG. 5). In yet another embodiment of the current profiler electronics, the Doppler frequency results can be stored in a recording media such as EEPROM that would be added on to the digital bus 168.

It will be appreciated by one skilled in the relevant technology that the DSP 196 is an optional element of the electronics assembly 162, and that the operations there specified may be carried out in the microcomputer 166.

Figure 8:
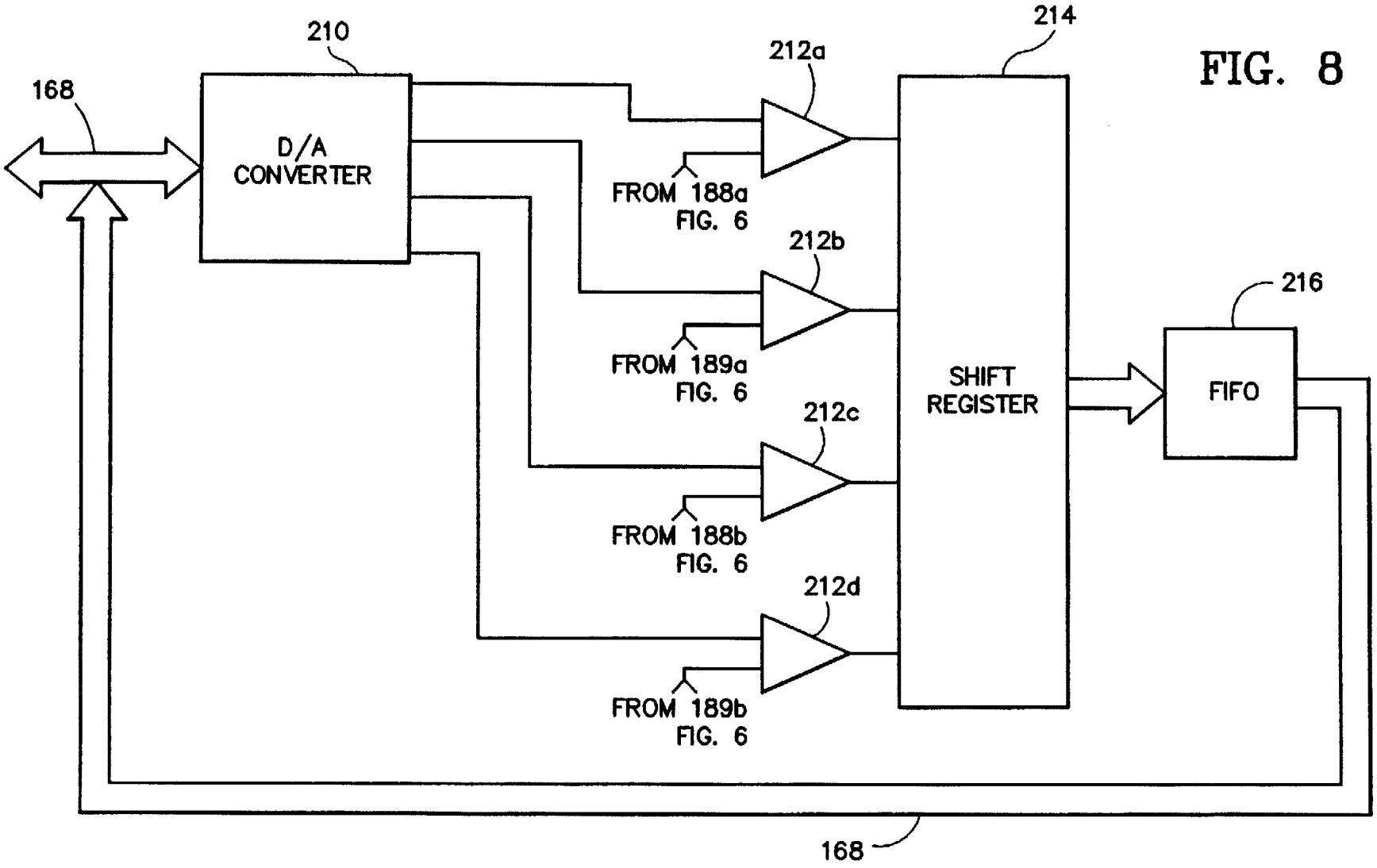
FIG. 8 is a block diagram of one preferred embodiment of the sampling module shown in FIG. 7.

FIG. 8 shows a block diagram of a portion of the sampling module 194. The portion shown corresponds to the circuitry necessary to sample processed signals received from two of the four transducers 152. A digital-to-analog (D/A) converter 210, preferably a PM7226 chip, receives a threshold control word from either the DSP 196 or microcomputer 166.

The resulting analog signals are fed to a set of comparators 212a,b,c,d. The quadrature signals from the low-pass filters 188a,b and 189a,b are also fed to the comparators 212, which compare the threshold signals to the quadrature signals. The comparators 212 are preferably implemented with high-speed CMOS circuits such as, for example, the TLC374 comparator chips distributed by Texas Instruments. The shift register 214, preferably formed from four 74HC4094 8 bit shift register chips, takes the output of the comparators 212 at a time specified by the timing generator 170 (FIG. 7) and converts the samples to a 16-bit parallel word for storage in the FIFO 216.

Once the shift register 214 is full, its output is strobed into a first-in-first-out (FIFO) buffer 216, preferably including four 4 bit×16 word 74HC40105 chips. The stored samples, up to 128, are then accessed by the DSP 196 via the digital bus 168. Thus, the DSP 196 does not have to continually read the shift register 214 since samples are buffered in the FIFO 216.

The basic idea behind the s ample module is that random scatterers cause the echo signal to generate as many highs as lows which should produce a zero mean signal. The DSP 196 or microcomputer 166 performs a statistical calculation to determine if the samples ar zero mean and, if not, then a new threshold control word is written to the D/A converter 210. This threshold manipulation eliminates voltage offsets likely caused by the circuitry, including such components as the low-pass filter 188, 189 (FIG. 7), comparators 212 and shift registers 214.

It will now be appreciated that the present at invention provides a means for measuring current velocity that offers improvements in the combination of profiling range and spatio-temporal resolution. The improvements stem from the use of a phase coded acoustic signal and autocorrelation processing to measure the Doppler shift between two pulses that are generated in a single transmission cycle.

Although the application of the present invention for measuring velocity disclosed herein relates to current profiling, it shall be understood that other velocity measurement applications would likely benefit from the present invention including the following: bottom tracking to determine vessel velocity, airborne object velocity measurements using radar, blood flow measurement and sewage and water velocities inside of pipes.

While the above detailed description has shown, described and pointed out the fundamental novel features of the invention as applied to various embodiments, it will be understood that various omissions and substitutions and changes in the form and details of the device illustrated may be made by those skilled in the art, without departing from the spirit of the invention.

What is claimed is:

1. A velocity measuring system, comprising:

a transmitting transducer for producing a beam pointing in a direction along which a phase change is measured;

pulse transmission means for providing a pulse train to the transmitting transducer, the pulse train comprising at least first and second emitted pulses having a predetermined pulse separation;

mean for complex sampling in echo return of the emitted pulses received by a receiving transducer so as to provide a first set of complex samples;

means for displaying the first set of complex samples by a selected time lag thereby producing a second set of complex samples;

means for computing a measured value of complex correlation using at least a portion of the first set of complex samples and at least a portion of the second set of samples; and means for obtaining a velocity measurement based on a Doppler frequency calculated from the complex correlation.

2. The system defined in claim 1, wherein each pulse is coded.

3. The system defined in claim 2, wherein the code comprises phase coding.

4. The system deemed in claim 3, wherein the phase coding includes 0°and 180°phase codes.

5. The system defined in claim 1, wherein the transmitting transducer and the receiving transducer are together a unitary transducer.

6. The system defined in claim 1, wherein the transmitting transducer and the receiving transducer are separate structures.

7. The system defined in claim 1, wherein the beam emits over a water column so that a plurality of velocity measurements are made at varying depths.

8. The system defined in claim 1, wherein the beam is an acoustic signal.

9. The system defined in claim 1, wherein the lag time is equal to the length of a selected pulse.

10. The system defined in claim 1, wherein the pulses are the same length.

11. The system defined in claim 1, wherein the lag time includes a time interval when the transducer is not transmitting.

[12. A method of deriving a measure of the relative velocity of a signal source-sensor combination and a field of scatterers separated therefrom by a medium through which the signal is propagated, wherein the source-sensor combination includes a transducer, the method comprising the steps of:

energizing the transducer to emit into the medium towards the field of scatterers a signal comprising a plurality of pulses having a predetermined separation, wherein the pulses include at least a first and second pulse;

sensing a signal comprising a set of echo returns of the pulses reflected from the field of scatterers;

complex sampling the echo return signal at preselected sampling intervals so as to provide a first set of complex samples;

delaying the first set of complex samples by a predetermined lag time so as to provide a second set of complex samples;

presenting to a complex correlator the first and second sets of samples wherein the fast set consists primarily of echoes from the first pulse and the second set consisting primarily of echoes from the second pulse, and forming as outputs the complex products of members of the first set with complex conjugates of members of the second set, to produce a complex correlation value; and obtaining a Doppler frequency based on the phase change calculated from the complex correlation value.]

[13. The method of claim 12, additionally comprising the step of calculating a velocity component of the scatterers using the Doppler frequency.]

[14. The method of claim 12, wherein the pulses are coded.]

[15. The method of claim 12, wherein the step of delayed samples comprises storing the first set of samples in a memory.]

[16. A current profiler, comprising:

a transducer for transmitting and a transducer for receiving an acoustic signal having fast and second coded pulses separated by a preselected lag time wherein the coded pulses are in water together for at least a portion of a selected time interval;

a sampler for sampling quadrature components of a received signal over a time interval which depends on the selected range cell, wherein the received signal comprises echoes of the coded pulses;

means for calculating the autocorrelation of the sampled quadrature components;

means for determining the Doppler frequency of the received signal comprising means for calculating the phase change of the acoustic signal from the autocorrelation result; and means for calculating a velocity using the Doppler frequency.]

17. [The] *A* current profiler, [defined in claim 16] *comprising:*

*a transducer for transmitting and a transducer for receiving an acoustic signal having first and second coded pulses separated by a preselected lag time wherein the coded pulses are in water together for at least a portion of a selected time interval;*

*a sampler for sampling quadrature components of a received signal over a time interval which depends on the selected range cell, wherein the received signal comprises echoes of the coded pulses;*

*means for calculating the autocorrelation of the sampled quadrature components;*

*means for determining the Doppler frequency of the received signal comprising means for calculating the phase change of the acoustic signal from the autocorrelation result; and*

*means for calculating a velocity using the Doppler frequency*, wherein a plurality of transducers are configured such that a plurality of orthogonal velocity components can be obtained.

18. The current profiler defined in claim 17, wherein the transducers are arranged in a Janus configuration.

19. The current profiler defined in claim [16] *17*, wherein the sampler comprises control means for limiting voltage offsets.

20. The current profiler defined in claim [16] *17*, wherein the velocity calculating means comprises means for normalizing the velocity to fixed earth reference coordinates.

21. The current profiler defined in claim [16] *17*, wherein the selected time interval depends on a round-trip time between scatterers at a selected range and the current profiler.

22. The current profiler defined in claim [16] *17*, wherein the transmitting and receiving transducers are together a unitary transducer.

23. The current profiler defined in claim [16] *17*, wherein the transmitting and receiving transducers are separate structures.

[24. A Doppler sonar system for providing velocity measurements, comprising:

a transducer;

a pulse generator communicating to the transducer two or more coded pulses of preselected length separated by a preselected lag time;

a complex sampling circuit connected to the transducer so as to provide quadrature components of a received echo signal; and a processor including autocorrelation means for generating the autocorrelation between a first set of quadrature samples and a second set of quadrature samples delayed by the lag time, the processor also including means for obtaining a velocity measurement based on a Doppler frequency calculated from the autocorrelation.]

[25. The system defined in claim 24, wherein the autocorrelation means comprises a digital signal processor.]

26. [The] *A Doppler sonar* system [defined in claim 24] *for providing velocity measurements, comprising:*

*a transducer;*

*a pulse generator communicating to the transducer two or more coded pulses of preselected length separated by a preselected lag time;*

*a complex sampling circuit connected to the transducer so as to provide quadrature components of a received echo signal; and*

*a processor including autocorrelation means for generating the autocorrelation between a first set of quadrature samples and a second set of quadrature samples delayed by the lag time, the processor also including means for obtaining a velocity measurement based on a Doppler frequency calculated from the autocorrelation*, wherein a plurality of transducers receive independently transmitted signals so as to measure a plurality of orthogonal velocity components.

27. The system defined in claim 26, wherein the transducers are configured to generate non-interfering signals.

28. The system defined in claim [24] *26*, wherein the coded pulses include one or more code elements, each code element defined by a predetermined portion of a carrier signal which is phase modulated according to one of a preselected set of phase codings.

29. The system defined in claim [24] *26*, wherein the lag time is selected according to a predetermined accuracy of range-velocity resolution.

30. The system defined in claim [24] *26*, wherein the coded pulse length is selected according to a predetermined accuracy of range resolution.

31. The system defined in claim [24] *26*, additionally comprising means for measuring amplitude.

32. The system defined in claim 31, wherein the amplitude measuring means comprises means for determining backscatter strength.

33. The system defined in claim 31, wherein the amplitude measuring means comprises means for determining particle concentration.

34. The system defined in claim 31, wherein the amplitude measuring means comprise means for measuring particle flux.

35. The system defined in claim 28, wherein the code elements of a second coded pulse are inverted with respect to a first coded pulse.

36. The system defined in claim 35, wherein the code elements are selected so that:

(1) the code has zero autocorrelation at one lag time to each side of the sidepeak;

(2) the code has less than a preselected number of sidelobes near the sidepeak; and (3) pairs of Golay codes are used in successive coded pulses.

*37. The system defined in claim 26, wherein the autocorrelation means comprises a digital signal processor.*

* * * * *

UNITED STATES PATENT AND TRADEMARK OFFICE

CERTIFICATE OF CORRECTION

PATENT NO. : RE 35,535
DATED : June 17, 1997
INVENTOR(S) : Brumley, Blair H. et al.

It is certified that error appears in the above-identified patent and that said Letters Patent is hereby corrected as shown below:

Column 1,
Line 10, before "BACKGROUND OF THE INVENTION" please add the following paragraph and heading -- "Governmental Rights This invention was made with Government support under Contract Number N00014-86-C-0832 awarded by The Office of Naval Research. The Government has certain rights in this invention." --

Signed and Sealed this

Fourth Day of February, 2003

JAMES E. ROGAN
*Director of the United States Patent and Trademark Office*